US012583474B2

(12) United States Patent     (10) Patent No.:   US 12,583,474 B2

Kim     (45) Date of Patent:    Mar. 24, 2026

(54) OBJECT RECOGNITION APPARATUS AND METHOD THEREOF

(71) Applicants: Hyundai Motor Company, Seoul (KR); Kia Corporation, Seoul (KR)

(72) Inventor: Hyun Ju Kim, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 147 days.

(21) Appl. No.: 18/650,717

(22) Filed: Apr. 30, 2024

(65) Prior Publication Data

US 2025/0091600 A1    Mar. 20, 2025

(30) Foreign Application Priority Data

Sep. 18, 2023    (KR) ........................ 10-2023-0124149

(51) Int. Cl.
   *B60W 50/14*      (2020.01)
   *G01S 17/89*      (2020.01)
(52) U.S. Cl.
   CPC ............. *B60W 50/14* (2013.01); *G01S 17/89* (2013.01); *B60W 2420/408* (2024.01); *B60W 2554/402* (2020.02)

(58) Field of Classification Search
None
See application file for complete search history.

(56) References Cited

U.S. PATENT DOCUMENTS

| | | | |
|---|---|---|---|
| 2021/0405197 A1* | 12/2021 | Lee | G01S 17/93 |
| 2023/0022335 A1* | 1/2023 | Kang | G01S 13/42 |
| 2024/0102824 A1* | 3/2024 | Wakayama | G06T 7/60 |

* cited by examiner

*Primary Examiner* — Thomas S Mccormack

(74) *Attorney, Agent, or Firm* — Banner & Witcoff, Ltd.

(57) ABSTRACT

An apparatus for recognizing an object and a method thereof are provided. The apparatus may comprise a sensor, a memory configured to store reference grid maps representing an appearance of a vehicle, and a processor configured to project a plurality of points indicating an external object, obtained by the sensor, onto a first surface to obtain a first grid map including a first plurality of grids, project the plurality of points indicating the external object onto a second surface to obtain a second grid map including a second plurality of grids, determine, based on at least one of the reference grid maps, the first grid map, or the second grid map, a type of the external object, and output a signal indicating the type of the external object.

20 Claims, 9 Drawing Sheets

OBJECT RECOGNITION
APPARATUS
100

PROCESSOR
110

LIDAR
120

MEMORY
130

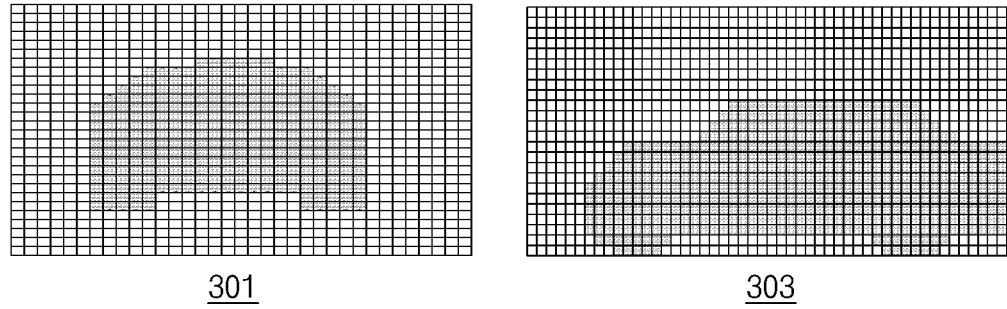
301                                    303
FIG.3

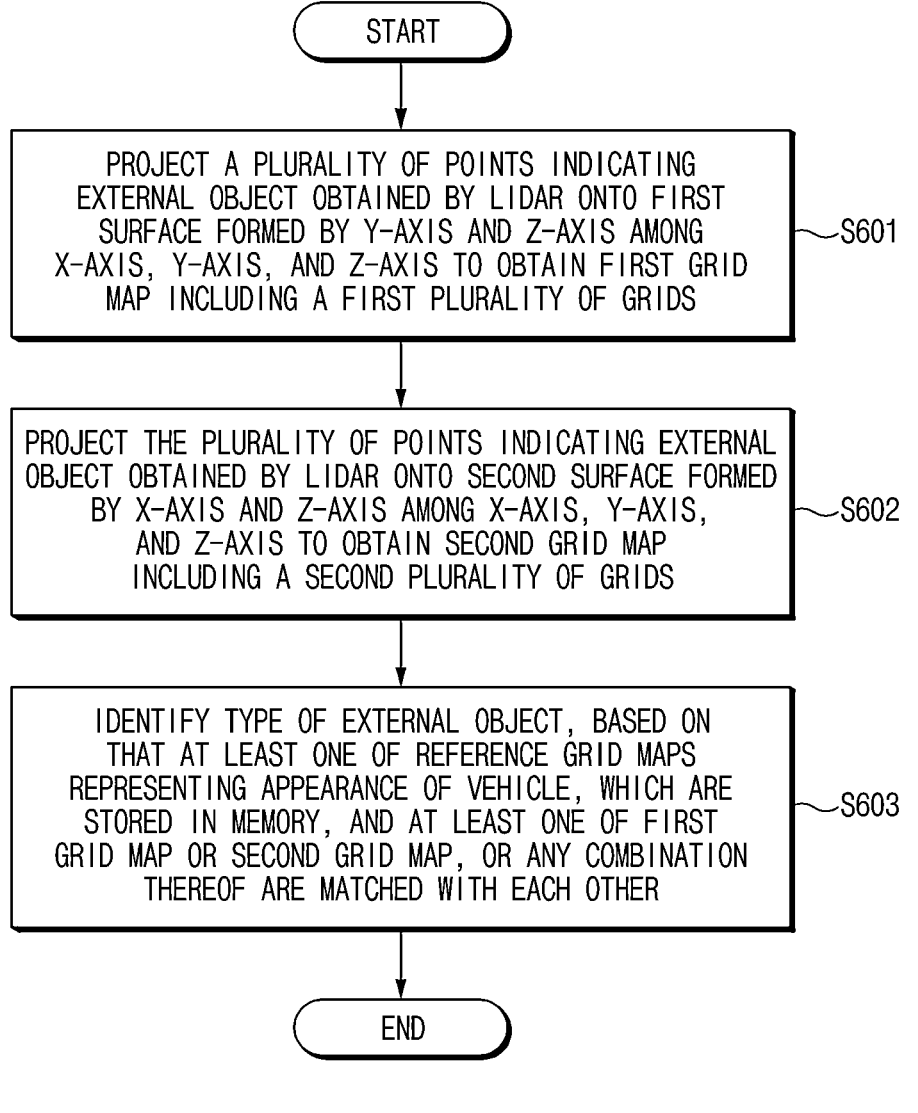

START

PROJECT A PLURALITY OF POINTS INDICATING
EXTERNAL OBJECT OBTAINED BY LIDAR ONTO FIRST
SURFACE FORMED BY Y-AXIS AND Z-AXIS AMONG
X-AXIS, Y-AXIS, AND Z-AXIS TO OBTAIN FIRST GRID
MAP INCLUDING A FIRST PLURALITY OF GRIDS                    ~S601

PROJECT THE PLURALITY OF POINTS INDICATING EXTERNAL
OBJECT OBTAINED BY LIDAR ONTO SECOND SURFACE FORMED
BY X-AXIS AND Z-AXIS AMONG X-AXIS, Y-AXIS,
AND Z-AXIS TO OBTAIN SECOND GRID MAP
INCLUDING A SECOND PLURALITY OF GRIDS                      ~S602

IDENTIFY TYPE OF EXTERNAL OBJECT, BASED ON
THAT AT LEAST ONE OF REFERENCE GRID MAPS
REPRESENTING APPEARANCE OF VEHICLE, WHICH ARE
STORED IN MEMORY, AND AT LEAST ONE OF FIRST
GRID MAP OR SECOND GRID MAP, OR ANY COMBINATION
THEREOF ARE MATCHED WITH EACH OTHER                        ~S603

END

FIG.6

OBJECT RECOGNITION APPARATUS AND METHOD THEREOF

CROSS-REFERENCE TO RELATED APPLICATION

This application claims the benefit of priority to Korean Patent Application No. 10-2023-0124149, filed in the Korean Intellectual Property Office on Sep. 18, 2023, the entire contents of which are incorporated herein by reference.

TECHNICAL FIELD

The present disclosure relates to an object recognition apparatus and a method thereof, and more particularly, relates to technologies of identifying a type of an external object using a sensor (e.g., a light detection and ranging (LiDAR) sensor).

BACKGROUND

Various studies for identifying an external object using various sensors are being conducted to assist with driving of a host vehicle.

Particularly, while the host vehicle is operating in a driving assistance device activation mode or an autonomous driving mode, an external object may be identified using a sensor (e.g., a LiDAR sensor).

If the external object is incorrectly identified using the LiDAR, it is separated and identified, thus causing an error in a vehicle control system. If a single external object is separated and identified, although the external object is operating, it may be identified as a static state, thus causing a problem in which a driving route of the host vehicle is rapidly changed.

SUMMARY

According to the present disclosure, an apparatus may comprise a sensor, a memory configured to store reference grid maps representing an appearance of a vehicle, and a processor configured to project a plurality of points indicating an external object onto a first surface to obtain a first grid map including a first plurality of grids, wherein the external object is obtained based on sensing information obtained by the sensor, and the first surface is formed by a second axis and a third axis among a first axis, the second axis, and the third axis, wherein the first axis is parallel to a driving direction of the vehicle and perpendicular to the second axis, and the third axis is perpendicular to the first axis and the second axis, project the plurality of points indicating the external object onto a second surface to obtain a second grid map including a second plurality of grids, wherein the second surface is formed by the first axis and the third axis, determine, based on at least one of the reference grid maps, the first grid map, or the second grid map, a type of the external object, and output a signal indicating the type of the external object.

The apparatus, wherein the processor is configured to display, based on the signal indicating the type of the external object, a map comprising the external object and perform, based on the type of the external object, autonomous driving control of the vehicle.

The apparatus, wherein the processor is configured to obtain, based on the external object being determined as in a moving state, at least one of the first grid map or the second grid map.

The apparatus, wherein the processor is configured to determine at least one of a first plurality of points among the plurality of points, wherein the first plurality of points are included in the first plurality of grids, and obtain, based on first grids including the at least one of the first plurality of points, the first grid map, wherein the first grid map corresponds to a rear surface of the external object.

The apparatus, wherein the processor is configured to determine first maximum values including a maximum value of the first plurality of points, wherein the first plurality of points are included in each of a plurality of columns in a plurality of rows, and the plurality of columns are included in the first grid map, determine first minimum values including a minimum value of the first plurality of points, and obtain, based on the first maximum values and the first minimum values, the first grid map indicating a rear outline of the external object.

The apparatus, wherein the processor is configured to determine first upper grids corresponding to the first maximum values, first lower grids corresponding to the first minimum values, and first middle grids included between the first upper grids and the first lower grids, determine first reference grids included in first reference grid maps among the reference grid maps, wherein the first reference grid maps represent a rear surface of the vehicle, determine whether first upper matching between the first upper grids and the first reference grids is performed, determine whether first lower matching between the first lower grids and the first reference grids is performed, determine whether first middle matching between the first middle grids and the first reference grids is performed, and determine, based on determinations of whether the first upper matching is performed, whether the first lower matching is performed, and whether the first middle matching is performed, the type of the external object.

The apparatus, wherein the processor is configured to determine at least one of a second plurality of points among the plurality of points, wherein the second plurality of points are included in the second plurality of grids, and obtain, based on second grids including the at least one of the second plurality of points, the second grid map, wherein the second grid map corresponds to a side surface of the external object.

The apparatus, wherein the processor is configured to determine second maximum values including a maximum value of the second plurality of points, wherein the second plurality of points are included in each of a plurality of columns in a plurality of rows, and the plurality of columns are included in the second grid map, determine second minimum values including a minimum value of the second plurality of points, and obtain, based on the second maximum values and the second minimum values, the second grid map, wherein the second grid map represents a rear outline of the external object.

The apparatus, wherein the processor is configured to determine second upper grids corresponding to the second maximum values, second lower grids corresponding to the second minimum values, and second middle grids included between the second upper grids and the second lower grids, determine second reference grids included in second grid maps among the reference grid maps, wherein the second grid maps represent a side surface of the vehicle, determine whether second upper matching between the second upper grids and the second reference grids is performed, determine whether second lower matching between the second lower grids and the second reference grids is performed, determine whether second middle matching between the second middle grids and the second reference grids is performed, and determine, based determinations of whether the second upper matching is performed, whether the second lower matching is performed, and whether the second middle matching is performed, the type of the external object.

The apparatus, wherein the processor is configured to allocate a first score to the first grid map, wherein the first score is determined based on the first grid map and a first reference grid map included in the reference grid maps, allocate a second score to the second grid map, wherein the second score is determined based on the second grid map and a second reference grid map included in the reference grid maps, and determine, based on at least one of the first score or the second score, the type of the external object.

The apparatus, wherein the processor is configured to allocate, based on the external object being detected on a same lane as a host vehicle including the apparatus, the first score to the first grid map, determine, based on the first score being greater than a first reference score, the type of the external object, allocate, based on the external object being detected on a different lane from the host vehicle including the apparatus, the first score to the first grid map, allocate, based on the external object being detected on the different lane from the host vehicle including the apparatus, the second score to the second grid map, and determine, based on a total score obtained by adding the first score and the second score being greater than a second reference score and the first reference score, the type of the external object or temporarily store information indicating the type of the external object.

According to the present disclosure, a method performed by a processor, the method may comprise projecting a plurality of points indicating an external object onto a first surface to obtain a first grid map including a first plurality of grids, wherein the external object is obtained based on sensing information obtained by a sensor, and the first surface is formed by a second axis and a third axis among a first axis, the second axis, and the third axis, wherein the first axis is parallel to a driving direction of a vehicle and perpendicular to the second axis, and the third axis is perpendicular to the first axis and the second axis, projecting the plurality of points indicating the external object onto a second surface to obtain a second grid map including a second plurality of grids, wherein the second surface is formed by the first axis and the third axis, determining, based on at least one of reference grid maps being stored in a memory, the first grid map, or the second grid map, a type of the external object, wherein the reference grid maps represent an appearance of the vehicle, and outputting a signal indicating the type of the external object.

The method, may further comprise obtaining, based on the external object being determined as in a moving state, at least one of the first grid map or the second grid map.

The method, may further comprise determining at least one of a first plurality of points among the plurality of points, wherein the first plurality of points are included in the first plurality of grids, and obtaining, based on first grids including the at least one of the first plurality of points, the first grid map, wherein the first grid map corresponds to a rear surface of the external object.

The method, may further comprise obtaining first maximum values including a maximum value of the first plurality of points, where in the first plurality of points are included in each of a plurality of columns in a plurality of rows, and the plurality of columns included in the first grid map, obtaining first minimum values including a minimum value of the first plurality of points, and obtaining, based on the first maximum values and the first minimum values, the first grid map indicating a rear outline of the external object.

The method, may further comprise determining first upper grids corresponding to the first maximum values, first lower grids corresponding to the first minimum values, and first middle grids included between the first upper grids and the first lower grids, determining first reference grids included in first reference grid maps among the reference grid maps, wherein the first reference grid maps represent a rear surface of the vehicle, determining whether first upper matching between the first upper grids and the first reference grids is performed, determining whether first lower matching between the first lower grids and the first reference grids is performed, determining whether first middle matching between the first middle grids and the first reference grids performed, and determining, based on determinations of whether the first upper matching is performed, whether the first lower matching is performed, and whether the first middle matching is performed, the type of the external object.

The method, may further comprise determining at least one of a second plurality of points among the plurality of points, wherein the second plurality of points are included in the second plurality of grids, and obtaining, based on second grids including the at least one of the second plurality of points, the second grid map, wherein the second grid map corresponds to a side surface of the external object.

The method, may further comprise determining second maximum values including a maximum value of the second plurality of points, wherein the second plurality of points are included in each of a plurality of columns in a plurality of rows, and the plurality of columns are included in the second grid map, determining second minimum values including a minimum value of the second plurality of points, and obtaining, based on the second maximum values and the second minimum values, the second grid map, wherein the second grid map represents a rear outline of the external object.

The method, may further comprise determining second upper grids corresponding to the second maximum values, second lower grids corresponding to the second minimum values, and second middle grids included between the second upper grids and the second lower grids, determining second reference grids included in second grid maps among the reference grid maps, wherein the second grid maps represent a side surface of the vehicle, determining whether second upper matching between the second upper grids and the second reference grids is performed, determining whether second lower matching between the second lower grids and the second reference grids is performed, determining whether second middle matching between the second middle grids and the second reference grids is performed, and determining, based determinations of whether the second upper matching is performed, whether the second lower matching is performed, and whether the second middle matching is performed, the type of the external object.

The method, may further comprise allocating a first score to the first grid map, wherein the first score is determined based on the first grid map and a first reference grid map included in the reference grid maps, allocating a second score to the second grid map, wherein the second score is determined based on the second grid map and a second reference grid map included in the reference grid maps, and determining, based on at least one of the first score or the second score, the type of the external object.

The method, may further comprise based on the external object being detected on a same lane as a host vehicle including the processor, allocating the first score to the first grid map, and determining, based on the first score being greater than a first reference score, the type of the external object, or based on the external object being detected on a different lane from the host vehicle including the processor, allocating the first score to the first grid map, allocating the second score to the second grid map, and determining, based on a total score obtained by adding the first score and the second score being greater than a second reference score and the first reference score, the type of the external object or temporarily storing the type of the external object.

BRIEF DESCRIPTION OF THE DRAWINGS

The above and other objects, features and advantages of the present disclosure will be more apparent from the following detailed description taken in conjunction with the accompanying drawings:

FIG. 3 shows an example associated with a reference grid map stored in a memory, in an example of the present disclosure;

FIG. 6 shows an example of a flowchart associated with an object recognition method according to another example of the present disclosure;

DETAILED DESCRIPTION

Figure 1:
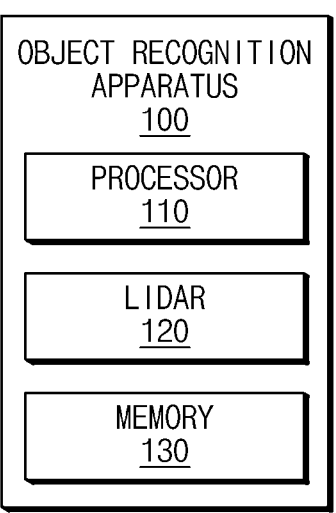
FIG. 1 shows an example of a block diagram of an object recognition apparatus according to an example of the present disclosure.

Hereinafter, some examples of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure.

In describing components of examples of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein.

Hereinafter, examples of the present disclosure will be described in detail with reference to FIGS. 1 to 9.

FIG. 1 shows an example of a block diagram of an object recognition apparatus according to an example of the present disclosure.

Referring to FIG. 1, an object recognition apparatus 100 according to an example of the present disclosure may be implemented inside or outside a vehicle, and some of components included in the object recognition apparatus 100 may be implemented inside or outside the vehicle. In this case, the object recognition apparatus 100 may be integrally configured with control units in the vehicle or may be implemented as a separate device to be connected with the control units of the vehicle by a separate connection means. For example, the object recognition apparatus 100 may further include components which are not shown in FIG. 1.

Referring to FIG. 1, the object recognition apparatus 100 according to an example may include a processor 110, light detection and ranging (LiDAR) 120, and a memory 130. The processor 110, the LiDAR 120, and the memory 130 may be electronically or operably coupled with each other by an electronical component including a communication bus.

Hereinafter, that pieces of hardware are operably coupled with each other may include that a direct connection or an indirect connection between the pieces of hardware is established in a wired or wireless manner, such that second hardware is controlled by first hardware among the pieces of hardware.

The different blocks are illustrated, but an example is not limited thereto. Some of the pieces of hardware of FIG. 1 may be included in a single integrated circuit including a system on a chip (SoC). Types of the pieces of hardware included in the object recognition apparatus 100 or the number of the pieces of hardware are limited to those shown in FIG. 1. For example, the object recognition apparatus 100 may include some of the pieces of hardware shown in FIG. 1.

The object recognition apparatus 100 according to an example may include hardware for processing data based on one or more instructions. The hardware for processing the data may include the processor 110. For example, the hardware for processing the data may include an arithmetic and logic unit (ALU), a floating point unit (FPU), a field programmable gate array (FPGA), a central processing unit (CPU), and/or an application processor (AP). The processor 110 may have a structure of a single-core processor or may have a structure of a multi-core processor including a dual core, a quad core, a hexa core, or an octa core.

The LiDAR 120 included in the object recognition apparatus 100 according to an example may obtain datasets for surrounding thing of the object recognition identifying a apparatus 100. For example, the LiDAR 120 may identify at least one of a position of the surrounding thing, a motion direction of the surrounding thing, or a speed of the surrounding thing, or any combination thereof, based on that a pulse laser signal radiated from the LiDAR 120 is reflected from the surrounding object to return.

The memory 130 included in the object recognition apparatus 100 according to an example may include a hardware component for storing data and/or an instruction input and/or from the processor 110 of the object recognition output apparatus 100.

For example, the memory 130 may include a volatile memory including a random-access memory (RAM) or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory may include at least one of a programmable ROM (PROM), an erasable PROM (EPROM), an electrically erasable PROM (EE-PROM), a flash memory, a hard disk, a compact disc, a solid state drive (SSD), or an embedded multi-media card (eMMC), or any combination thereof.

In an example, the processor 110 of the object recognition apparatus 100 may obtain a plurality of points indicating an external object obtained by the LiDAR 120. The processor 110 may project the plurality of points indicating the external object obtained by the LiDAR 120 onto a surface formed by two of an x-axis, a y-axis, and a z-axis. For example, the x-axis may include a first axis. For example, the y-axis may include a second axis. For example, the z-axis may include a third axis. Hereinafter, for convenience of description, the first axis is referred to as the x-axis, the second axis is referred to as the y-axis, and the third axis is referred to as the z-axis. However, the first axis, the second axis, and/or the third axis are not limited to the above-mentioned example.

For example, the processor 110 may project the plurality of points indicating the external object obtained by the LiDAR 120 onto a first surface formed by the y-axis and the z-axis among the x-axis, the y-axis, and the z-axis to obtain a first grid map including a first plurality of grids. For example, the first grid map may include a grid map corresponding to a rear surface of the external object. For example, the grid map may include a plurality of grids formed by a plurality of rows and a plurality of columns. For example, the plurality of grids may include a plurality of grid cells.

For example, the processor 110 may project the plurality of points indicating the external object obtained by the LiDAR 120 onto a second surface formed by the x-axis and the z-axis among the x-axis, the y-axis, and the z-axis to obtain a second grid map including a second plurality of grids. For example, the second grid map may include a grid map corresponding to a side surface of the external object.

In an example, the processor 110 may identify reference grid maps representing the appearance of a vehicle, which are stored in the memory 130. The processor 110 may identify whether at least one of the reference grid maps representing the appearance of the vehicle, which are stored in the memory 130, and at least one of the first grid map or the second grid map, or any combination thereof are matched with each other.

In an example, the processor 110 may identify a type of the external object, based on that the at least one of the reference grid maps representing the appearance of the vehicle, which are stored in the memory 130, and the at least one of the first grid map or the second grid map, or the any combination thereof are matched with each other.

For example, the type of the external object may be associated with a type of the vehicle. For example, the type of the external object may include at least one of a sedan, a large truck, a 1-ton cargo truck, a sport utility vehicle (SUV), a van, a 1-ton box truck, a trailer, or a large cargo truck, or any combination thereof.

In an example, the processor 110 may obtain a grid map for identifying a type of an external object identified by the LiDAR 120, based on that the external object is identified as a moving state between a static state and the moving state. The processor 110 may obtain a grid map for identifying a type of an external object which is being tracked, based on that the external object is identified as the moving state using the LiDAR 120.

In an example, the processor 110 may obtain at least one of the first grid map or the second grid map, or any combination thereof, based on that the external object is identified in a specified range. For example, the specified range may include a distance spaced apart about 20 m from the front of the vehicle including the object recognition apparatus 100. For example, the specified range may include a distance spaced apart about 15 m from one side of the vehicle including the object recognition apparatus 100. For example, the processor 110 of the object recognition apparatus 100 may obtain at least one of the first grid map or the second grid map, or any combination thereof for identifying a type of the external object, based on identifying the external object in the specified range.

Hereinafter, a description will be given of an example of identifying the type of the external object, based on projecting the plurality of points onto the first surface formed by the y-axis and the z-axis to obtain the first grid map including the first plurality of grids.

In an example, the processor 110 may identify at least one (e.g., all or some) of a first plurality of points included in the first plurality of grids among the plurality of points. For example, the first plurality of points may be obtained based on that the plurality of points obtained by the LiDAR 120 are projected onto the first surface.

In an example, the processor 110 may identify first grids including the all or some of the first plurality of points among the first plurality of grids. For example, the first grids may include grids in which the first plurality of points are identified. The processor 110 may obtain the first grid map corresponding to the rear surface of the external object, based on the first grids including the all or some of the first plurality of points among the first plurality of grids.

In an example, the processor 110 may identify a maximum value of the first plurality of points included in each of a plurality of columns, in a plurality of rows and the plurality of columns included in the first grid map. For example, the processor 110 may identify first maximum values including the maximum value of the first plurality of points included in each of the plurality of columns.

In an example, the processor 110 may identify a minimum value of the first plurality of points included in each of the plurality of columns. The processor 110 may identify first minimum values including the minimum value of the first plurality of points included in each of the plurality of columns.

In an example, the processor 110 may obtain the first grid map indicating a rear outline of the external object, based on the first maximum values and the first minimum values.

In an example, the processor 110 may identify first upper grids corresponding to the first maximum values. The processor 110 may identify first lower grids corresponding to the first minimum values. The processor 110 may identify first middle grids included between the first upper grids and the first lower grids. As described above, the processor 110 may identify the first upper grids, the first lower grids, and the first middle grids.

In an example, the processor 110 may identify first reference grids included in the first reference grid maps representing the rear surface of the vehicle among the reference grid maps included in the memory 130. A description associated with the first reference grid maps will be described below with reference to FIGS. 2 and 3.

In an example, the processor 110 may identify the first reference grids included in the first reference grid maps. For example, the first reference grids may include grids, included in the first reference grid maps, for representing the rear surface of the vehicle.

In an example, the processor 110 may identify whether first upper matching between the first upper grids and the first reference grids is performed. For example, the processor 110 may identify whether the first upper grids and upper grids included in the first reference grid maps are matched with each other. Whether the first upper matching is performed may be associated with an operation of identifying whether the first upper grids and the upper grids included in the first reference grid maps are matched with each other.

In an example, the processor 110 may identify whether first lower matching between the first lower grids and the first reference grids is performed. For example, the processor 110 may identify whether the first lower grids and lower grids included in the first reference grid maps are matched with each other. Whether the first lower matching is performed may be associated with an operation of identifying whether the first lower grids and the lower grids included in the first reference grid maps are matched with each other.

In an example, the processor 110 may identify whether first middle matching between the first middle grids and the first reference grids is performed. For example, the processor 110 may identify whether the first middle grids and middle grids included in the first reference grid maps are matched with each other. Whether the first middle matching is performed may be associated with an operation of identifying whether the first middle grids and the middle grids included in the first reference grid maps are matched with each other.

In an example, the processor 110 may identify a type of the external object, based on a matching number and a non-matching number calculated by means of whether the first upper matching is performed, whether the first lower matching is performed, and whether the first middle matching is performed. For example, the matching number calculated by means of whether the first upper matching is performed may include a number in which the first upper grids and the upper grids included in the first reference grid maps are matched with each other. For example, the matching number calculated by means of whether the first lower matching is performed may include a number in which the first lower grids and the lower grids included in the first reference grid maps are matched with each other. For example, the matching number calculated by means of whether the first middle matching is performed may include a number in which the first middle grids and the middle grids included in the first reference grid maps are matched with each other.

For example, the non-matching number calculated by means of whether the first upper matching is performed may include a number in which the first upper grids and the upper grids included in the first reference grid maps are not matched with each other. For example, the non-matching number calculated by means of whether the first lower matching is performed may include a number in which the first lower grids and the lower grids included in the first reference grid maps are not matched with each other. For example, the non-matching number calculated by means of whether the first middle matching is performed may include a number in which the first middle grids and the middle grids included in the first reference grid maps are not matched with each other.

As described above, the processor 110 of the object recognition apparatus 100 according to an example may identify a type of the external object, based on the matching number and the non-matching number calculated by means of whether the first upper matching is performed, whether the first lower matching is performed, and whether the first middle matching is performed.

Hereinafter, a description will be given of an example of identifying the type of the external object, based on projecting the plurality of points onto the second surface formed by the x-axis and the z-axis to obtain the second grid map including the second plurality of grids.

In an example, the processor 110 may identify all or some of a second plurality of points included in the second plurality of grids among the plurality of points. For example, the second plurality of points may be obtained based on that the plurality of points obtained by the LiDAR 120 are projected onto the second surface.

In an example, the processor 110 may identify second grids including the all or some of the second plurality of points among the second plurality of grids. For example, the second grids may include grids in which the second plurality of points are identified. The processor 110 may obtain the second grid map corresponding to the side surface of the external object, based on the second grids including the all or some of the second plurality of points among the second plurality of grids.

In an example, the processor 110 may identify a maximum value of the second plurality of points included in each of a plurality of columns, in a plurality of rows and the plurality of columns included in the second grid map. For example, the processor 110 may identify second maximum values including the maximum value of the second plurality of points included in each of the plurality of columns.

In an example, the processor 110 may identify a minimum value of the second plurality of points included in each of the plurality of columns. The processor 110 may identify second minimum values including the minimum value of the second plurality of points included in each of the plurality of columns.

In an example, the processor 110 may obtain the second grid map indicating the rear outline of the external object, based on the second maximum values and the second minimum values.

In an example, the processor 110 may identify second upper grids corresponding to the second maximum values. The processor 110 may identify second lower grids corresponding to the second minimum values. The processor 110 may identify second middle grids included between the second upper grids and the second lower grids. As described above, the processor 110 may identify the second upper grids, the second lower grids, and the second middle grids.

In an example, the processor 110 may identify second reference grids included in the second reference grid maps representing the rear surface of the vehicle among reference grid maps included in the memory 130. A description associated with the second reference grid maps will be described below with reference to FIG. 2.

In an example, the processor 110 may identify the second reference grids included in the second reference grid maps. For example, the second reference grids may include grids, included in the second reference grid maps, for representing the rear surface of the vehicle.

In an example, the processor 110 may identify whether second upper matching between the second upper grids and the second reference grids is performed. For example, the processor 110 may identify whether the second upper grids and upper grids included in the second reference grid maps are matched with each other. Whether the second upper matching is performed may be associated with an operation of identifying whether the second upper grids and the upper grids included in the second reference grid maps are matched with each other.

In an example, the processor 110 may identify whether second lower matching between the second lower grids and the second reference grids is performed. For example, the processor 110 may identify whether the second lower grids and lower grids included in the second reference grid maps are matched with each other. Whether the second lower matching is performed may be associated with an operation of identifying whether the second lower grids and the lower grids included in the second reference grid maps are matched with each other.

In an example, the processor 110 may identify whether second middle matching between the second middle grids and the second reference grids is performed. For example, the processor 110 may identify whether the second middle grids and middle grids included in the second reference grid maps are matched with each other. Whether the second middle matching is performed may be associated with an operation of identifying whether the second middle grids and the middle grids included in the second reference grid maps are matched with each other.

In an example, the processor 110 may identify a type of the external object, based on a matching number and a non-matching number calculated by means of whether the second upper matching is performed, whether the second lower matching is performed, and whether the second middle matching is performed. For example, the matching number calculated by means of whether the second upper matching is performed may include a number in which the second upper grids and the upper grids included in the second reference grid maps are matched with each other. For example, the matching number calculated by means of whether the second lower matching is performed may include a number in which the second lower grids and the lower grids included in the second reference grid maps are matched with each other. For example, the matching number calculated by means of whether the second middle matching is performed may include a number in which the second middle grids and the middle grids included in the second reference grid maps are matched with each other.

For example, the non-matching number calculated by means of whether the second upper matching is performed may include a number in which the second upper grids and the upper grids included in the second reference grid maps are not matched with each other. For example, the non-matching number calculated by means of whether the second lower matching is performed may include a number in which the second lower grids and the lower grids included in the second reference grid maps are not matched with each other. For example, the non-matching number calculated by means of whether the second middle matching is performed may include a number in which the second middle grids and the middle grids included in the second reference grid maps are not matched with each other.

As described above, the processor 110 of the object recognition apparatus 100 according to an example may identify a type of the external object, based on the matching number and the non-matching number calculated by means of whether the second upper matching is performed, whether the second lower matching is performed, and whether the second middle matching is performed.

In an example, the processor 110 may identify a first matching number and a first non-matching number by means of whether the first upper matching is performed, whether the first lower matching is performed, and whether the first middle matching is performed. The processor 110 may identify a second matching number and a second non-matching number by means of whether the second upper matching is performed, whether the second lower matching is performed, and whether the second middle matching is performed.

For example, the processor 110 may identify a first score, based on the first reference grids included in the first reference grid map, the first matching number, and the first non-matching number. The processor 110 may identify a type of the external object, based on that the first score is matched with one of the first reference grid maps.

For example, the processor 110 may identify a second score, based on the second reference grids included in the second reference grid map, the second matching number, and the second non-matching number. The processor 110 may identify a type of the external object, based on that the second score is matched with one of the second reference grid maps.

As described above, the object recognition apparatus 100 according to an example may identify the maximum value and the minimum value in each of the plurality of columns of the grid map and may identify the type of the external object, thus increasing a calculation speed and decreasing the amount of calculation of the processor 110.

Figure 2:
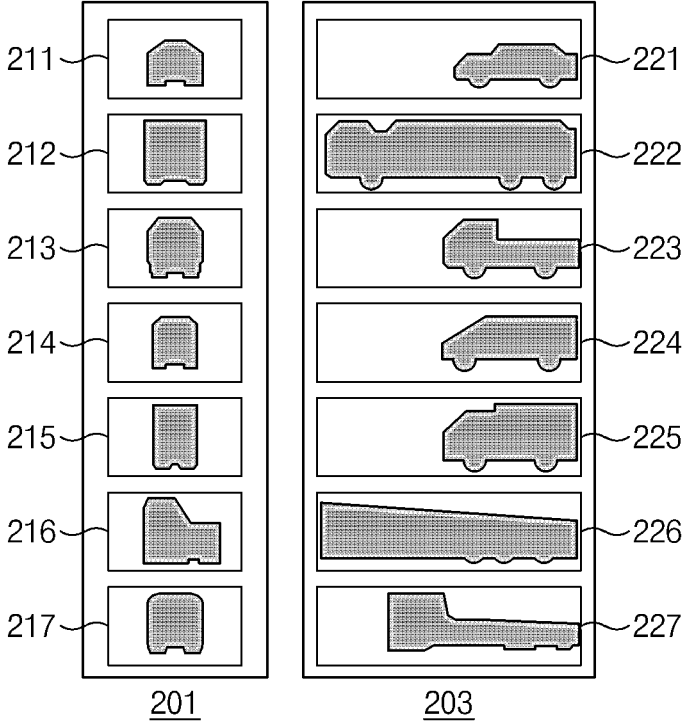
FIG. 2 shows an example associated with a reference grid map stored in a memory, in an example of the present disclosure.

FIG. 2 shows an example associated with a reference grid map stored in a memory, in an example of the present disclosure.

Processes described with reference to FIG. 2 may be performed by an object recognition apparatus 100 of FIG. 1. Alternatively, the processes described with reference to FIG. 2 may be performed by a processor 110 included in the object recognition apparatus 100 of FIG. 1.

Referring to FIG. 2, first reference grid maps 201 may include templates representing rear surfaces of vehicles based on a first surface formed by a y-axis and a z-axis among an x-axis (e.g., parallel to a driving direction of a vehicle), the y-axis (e.g., perpendicular to x-axis), and the z-axis (e.g., particular to both an x-axis and the y-axis). Second reference grid maps 203 may include templates representing side surfaces of the vehicles based on a second surface formed by the x-axis and the z-axis among the x-axis, the y-axis, and the z-axis.

In an example, a memory included in an object recognition apparatus may include the first reference grid maps 201 and the second reference grid maps 203, which represent the appearance of the vehicle.

For example, the first reference grid maps 201 may include a plurality of grids. For example, the first reference grid maps 201 may include the plurality of grids divided by a plurality of columns and a plurality of rows. For example, each of the first grid maps 201 may include about 30 rows and about 50 columns.

For example, the second reference grid maps 203 may include a plurality of grids. For example, the second reference grid maps 203 may include the plurality of grids divided by a plurality of rows and a plurality of columns. For example, each of the second grid maps 203 may include about 30 rows and about 100 columns.

Templates described below are an example of the first reference grid maps 201 and the second reference grid maps 203 and are not limited to names.

For example, the first templates 211 and 221 may include templates representing the appearance of a sedan. For example, the first template 211 may include a template representing the rear surface of the sedan. For example, the first template 221 may include a template representing the side surface of the sedan.

For example, second templates 212 and 222 may include templates representing the appearance of a truck with a first size. For example, the truck with the first size may include a truck with a size larger than a truck with a second size and a truck with a third size, which will be described below. For example, the second template 222 may include a template representing the rear surface of the truck with the first size. For example, the second template 222 may include a template representing the side surface of the truck with the first size.

For example, third templates 213 and 223 may include templates representing the appearance of the truck with the second size. For example, the truck with the second size may include a truck with a size smaller than the truck with the first size and the truck with the third size. For example, the truck with the second size may include a 1-ton truck. For example, the third template 213 may include a template representing the rear surface of the truck with the second size. For example, the third template 223 may include a template representing the side surface of the truck with the second size.

For example, fourth templates 214 and 224 may include templates representing the appearance of a van or a sport utility vehicle (SUV). For example, the fourth template 214 may include a template representing the rear surface of the van or the SUV. For example, the fourth template 224 may include a template representing the side surface of the van or the SUV.

For example, fifth templates 215 and 225 may include templates representing the appearance of a truck in which a box is coupled to the truck with the second size. For example, the fifth template 215 may include a template representing the rear surface of the truck in which the box is coupled to the truck with the second size. For example, the fifth template 225 may include a template representing the side surface of the truck in which the box is coupled to the truck with the second size.

For example, sixth templates 216 and 226 may include templates representing the appearance of a cargo truck connected with a trailer. For example, the sixth template 216 may include a template representing the rear surface of the cargo truck connected with the trailer. For example, the sixth template 226 may include a template representing the side surface of the cargo truck connected with the trailer.

For example, seventh templates 217 and 227 may include templates representing the appearance of the truck with the third size. For example, the truck with the third size may include a truck which is smaller than the truck with the first size and is larger than the truck with the second size. For example, the truck with the third size may include a 2.5-ton truck. For example, the seventh template 217 may include a template representing the rear surface of the truck with the third size. For example, the seventh template 227 may include a template representing the side surface of the truck with the third size.

As described above, the templates may include grids included in Table 1 below.

TABLE 1

| | First reference grid map | | Second reference grid map | |
| Type | Representation grid | Background grid | Representation grid | Background grid |
| --- | --- | --- | --- | --- |
| Sedan | k1 | l1 | m1 | n1 |
| Large truck | k2 | l2 | m2 | n2 |
| 1-ton cargo truck | k3 | l3 | m3 | n3 |
| Bongo | k4 | l4 | m4 | n4 |
| 1-ton box truck | k5 | l5 | m5 | n5 |
| Trailer | k6 | l6 | m6 | n6 |
| Large cargo truck | k7 | l7 | m7 | n7 |

Referring to Table 1 above, the type may include a type of an external object. The types described with reference to Table 1 above may sequentially correspond to the first to seventh templates 211 to 227. For example, the first templates 211 and 221 may include templates representing a sedan. For example, the second templates 212 and 222 may include templates representing a large truck. For example, the third templates 213 and 223 may include templates representing a 1-ton cargo truck. For example, the fourth templates 214 and 224 may include templates representing a Bongo. For example, the fifth templates 215 and 225 may include templates representing a 1-ton box truck. For example, the sixth templates 216 and 226 may include templates representing a trailer. For example, the seventh templates 217 and 227 may include templates representing a large cargo truck.

In Table 1 above, the representation grid may include at least one of first reference grids included in a first reference grid map or second reference grids included in a second reference grid map, or any combination thereof. In Table 1 above, the background grid may include grids which do not indicate a type of a vehicle.

In an example, a processor of the object recognition apparatus may compare at least one of representation grids or background grids, which are included in respective reference grid maps (e.g., the first reference grid maps 201 and the second reference grid maps 203) of FIG. 2, or any combination thereof with grid maps corresponding to the external object and may identify a type of the external object. For example, the processor may compare the first reference grid maps 201 with a first grid map indicating the rear surface of the external object and may identify the type of the external object. For example, the processor may compare the second reference grid maps 203 with a second grid map indicating the side surface of the external object and may identify the type of the external object.

FIG. 3 shows an example associated with a reference grid map stored in a memory, in an example of the present disclosure.

Processes described with reference to FIG. 3 may be performed by an object recognition apparatus 100 of FIG. 1. Alternatively, the processes described with reference to FIG. 3 may be performed by a processor 110 included in the object recognition apparatus 100 of FIG. 1.

Referring to FIG. 3, a first reference grid map 301 of FIG. 3 may include an example of representing a first template 211 of FIG. 2 with a plurality of grids. A second reference grid map 303 of FIG. 3 may include an example of representing a first template 221 of FIG. 2 with the plurality of grids.

Referring to FIG. 3, the first reference grid map 301 and the second reference grid map 303 may include reference grids representing a vehicle. For example, the first reference grid map 301 may include first reference grids representing a rear surface of the vehicle. For example, the second reference grid map 303 may include second reference grids representing a side surface of the vehicle.

For example, the first reference grid map 301 may include first representation grids. For example, the first reference grid map 301 may include first background grids.

For example, the second reference grid map 303 may include second representation grids. For example, the second reference grid map 303 may include second background grids.

In an example, a processor of an object recognition apparatus may compare a first grid map indicating a rear surface of an external object with the first reference grid map 301. For example, the processor may identify first maximum values including a maximum value identified from each of a plurality of columns included in the first grid map indicating the rear surface of the external object. For example, the processor may identify first minimum values including a minimum value identified from each of the plurality of columns included in the first grid map indicating the rear surface of the external object. For example, the processor may identify first upper grids corresponding to the first maximum values. For example, the processor may identify first lower grids corresponding to the first minimum values. The processor may identify first middle grids included between the first upper grids and the first lower grids.

In an example, the processor may identify whether the first upper grids, the first lower grids, and the first middle grids are matched with the first reference grids included in the first reference grid map 301. The processor may compare the first upper grids, the first lower grids, and the first middle grids with the first representation grids and the first background grids. The processor may identify a type of the external object, based on comparing the first upper grids, the first lower grids, and the first middle grids with the first representation grids and the first background grids.

In an example, the processor of the object recognition apparatus may compare a second grid map indicating a side surface of the external object with the second reference grid map 303. For example, the processor may identify second maximum values including a maximum value identified from each of a plurality of columns included in the second grid map indicating the side surface of the external object. For example, the processor may identify second minimum values including a minimum value identified from each of the plurality of columns included in the second grid map indicating the rear surface of the external object. For example, the processor may identify second upper grids corresponding to the second maximum values. For example, the processor may identify second lower grids corresponding to the second minimum values. The processor may identify second middle grids included between the first upper grids and the first lower grids.

In an example, the processor may identify whether the second upper grids, the second lower grids, and the second middle grids are matched with the second reference grids included in the second reference grid map 303. The processor may compare the second upper grids, the second lower grids, and the second middle grids with the second representation grids and the second background grids. The processor may identify a type of the external object, based on comparing the second upper grids, the second lower grids, and the second middle grids with the second representation grids and the second background grids.

Figure 4:
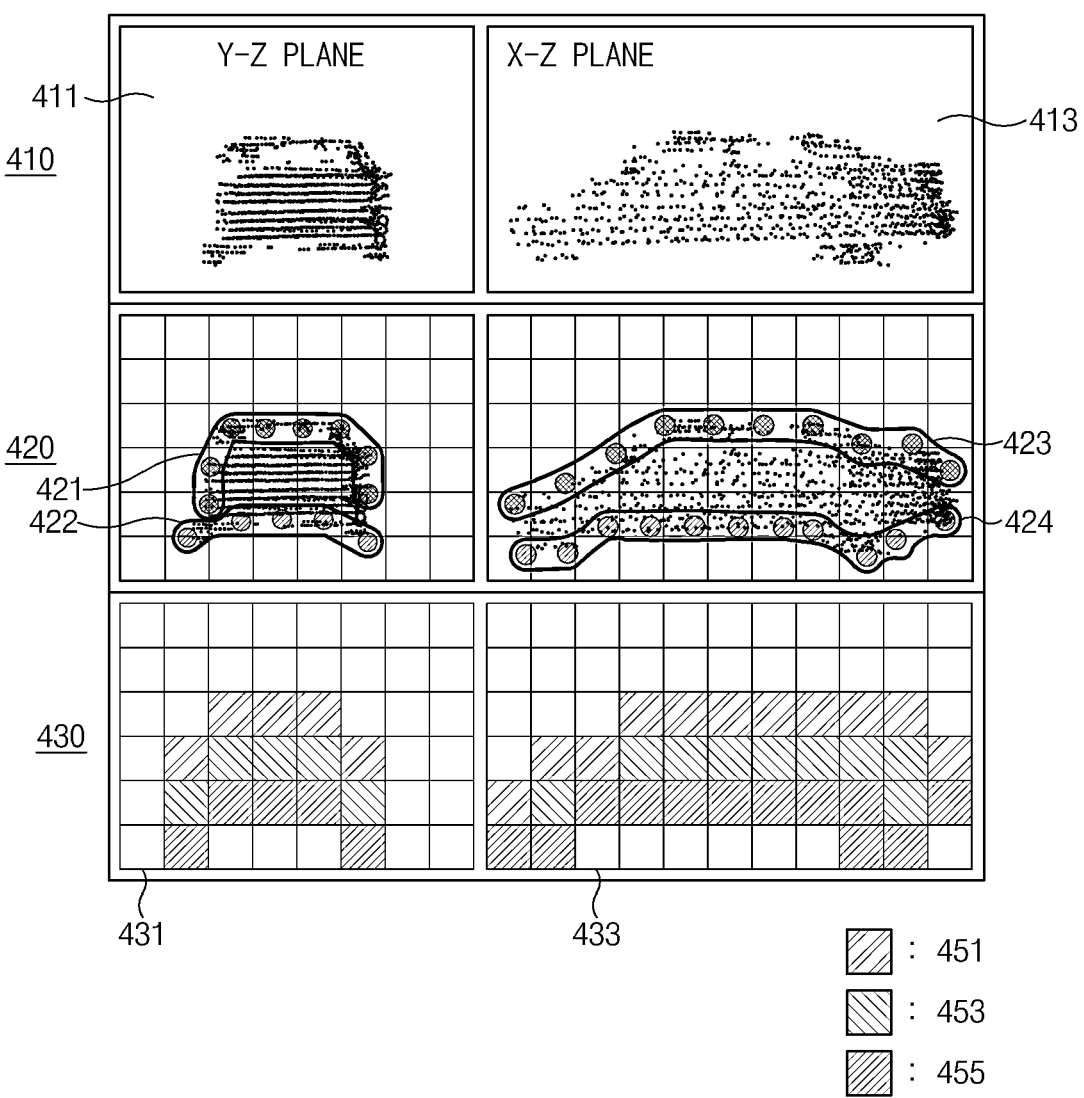
FIG. 4 shows an example of a grid map corresponding to an external object, in an example of the present disclosure.

FIG. 4 shows an example of a grid map corresponding to an external object, in an example of the present disclosure.

Processes described with reference to FIG. 4 may be performed by an object recognition apparatus 100 of FIG. 1. Alternatively, the processes described with reference to FIG. 4 may be performed by a processor 110 included in the object recognition apparatus 100 of FIG. 1.

Referring to FIG. 4, a processor of an object recognition apparatus according to an example may detect an external object using LiDAR. For example, the processor may identify a plurality of points indicating the external object obtained by the LiDAR. For example, the external object may be represented as a first example 410 by the plurality of points obtained by the LiDAR.

In an example, the processor may project the plurality of points onto a surface formed by two of an x-axis (e.g., a driving direction of a vehicle), a y-axis (e.g., perpendicular to the x-axis), and a z-axis (e.g., perpendicular to both the x-axis and the y-axis). The processor may project the plurality of points onto a first surface 411 formed by the y-axis and the z-axis among the x-axis, the y-axis, and the z-axis. The processor may identify a first plurality of points based on projecting the plurality of points onto the first surface 411.

In an example, the processor may identify a plurality of rows and a plurality of columns including a plurality of grids, on the first surface 411 like a second example 420. The processor may identify a maximum value and a minimum value from each of the plurality of columns. The processor may identify first maximum values 421 including the maximum value identified from each of the plurality of columns. The processor may identify first minimum values 422 including the minimum value identified from each of the plurality of columns.

Referring to a third example 430, the processor may identify first upper grids 451 respectively corresponding to the first maximum values 421. The processor may identify first lower grids 453 respectively corresponding to the first minimum values 422. The processor may identify first middle grids 455 included between the first upper grids 451 and the first lower grids 453. The processor may obtain a first grid map 431 including the first upper grids 451, the first lower grids 453, and the first middle grids 455.

In an example, the processor may project the plurality of points onto a surface formed by two of the x-axis, the y-axis, and the z-axis. The processor may project the plurality of points onto a second surface 413 formed by the x-axis and the z-axis among the x-axis, the y-axis, and the z-axis. The processor may identify a second plurality of points based on projecting the plurality of points onto the second surface 413.

In an example, the processor may identify a plurality of rows and a plurality of columns including a plurality of grids, on the second surface 413 like the second example 420. The processor may identify a maximum value and a minimum value from each of the plurality of columns. The processor may identify second maximum values 423 including the maximum value identified from each of the plurality of columns. The processor may identify second minimum values 424 including the minimum value identified from each of the plurality of columns.

Referring to a third example 430, the processor may identify second upper grids 451 respectively corresponding to the second maximum values 423. The processor may identify second lower grids 453 respectively corresponding to the second minimum values 424. The processor may identify second middle grids 455 included between the second upper grids 451 and the second lower grids 453. The processor may obtain a second grid map 433 including the second upper grids 451, the second lower grids 453, and the second middle grids 455.

Hereinafter, a description will be given of an example of identifying upper grids and lower grids with reference to Table 2 below, Equation 1 below, and Table 3 below.

TABLE 2

```
if (YZFace[col].curMaxRow < row_input)
YZFace[col].curMaxRow = row_input
if (YZFace[col].curMinRow < row_input
YZFace[col].curMaxRow < row_input
if (YZFace[col].curCnt < PIXEL_SIZE)
YZFace[col].curCnt++
if (XZFace[col].curMaxRow < row_input)
XZFace[col].curMaxRow = row_input
if (XZFace[col].curMinRow < row_input
XZFace[col].curMaxRow < row_input
if (XZFace[col].curCnt < PIXEL_SIZE)
XZFace[col].curCnt++
```

Table 2 above may include instructions (or program codes) for identifying a maximum value and a minimum value from each of a plurality of columns, using a plurality of points indicating the external object at a current time point. Table 2 above may include instructions (or program codes) for calculating an occupancy counter of the plurality of points indicating the external object, which are accumulated from a past time point to a current time point.

For example, if (YZFace[col].curMaxRow<row_input) YZFace[col].curMaxRow=row_input in Table 2 above may include instructions for identifying a maximum value on the first surface formed by the y-axis and the z-axis at the current time point.

For example, if (YZFace[col].curMinRow<row_input YZFace[col].curMaxRow<row_input in Table 2 above may include instructions for identifying a minimum value on the first surface formed by the y-axis and the z-axis at the current time point.

For example, if (YZFace[col].curCnt<PIXEL_SIZE) YZFace[col].curCnt++ in Table 2 above may include instructions for identifying whether a size of a first grid map obtained at the current time point is matched with a size of a first reference grid map.

For example, if (XZFace[col].curMaxRow<row_input) XZFace[col].curMaxRow=row_input in Table 2 above may include instructions for identifying a maximum value on a second surface formed by the x-axis and the z-axis at the current time point.

For example, if (XZFace[col].curMinRow<row_input XZFace[col].curMaxRow<row_input in Table 2 above may include instructions for identifying a minimum value on the second surface formed by the x-axis and the z-axis at the current time point.

For example, if (XZFace[col].curCnt<PIXEL_SIZE) XZFace[col].curCnt++ in Table 2 above may include instructions for identifying whether a size of a second grid map obtained at the current time point is matched with a size of a second reference grid map.

$$Average_{YZFace} = \frac{\sum_{col}^{PIXEL\_COL\_SIZE} YZFace[col].curCnt}{NumOfCol}$$ [Equation 1]

TABLE 3

```
for (col < PIXEL_COL_SIZE
if (YZFace[col].curCnt < Average_{YZFace}
YZFace[col].curMaxRow = 0
YZFace[col].MaxRow = 0
else
YZFace[col].MaxRow = YZFace[col].curMaxRow
YZFace[col].MinRow = YZFace[col].curMinRow
```

Referring to Equation 1 above, the processor may obtain $Average_{YZFace}$ using YZFace[col].curCnt obtained from Table 1 above. For example, $Average_{YZFace}$ may include an average value of grids for identifying a plurality of points indicating the rear surface of the external object from each of the plurality of columns included in the first grid map. NumOfCol of Equation 1 above may include the number of the plurality of columns included in the grid map. PIXEL_COL_SIZE of Equation 1 above may include the number of the columns included in the reference grid map. YZFace[col].curCnt of Equation 1 above may include the number of the columns including grids indicating the external object at the current time point.

Referring to Table 3 above, the processor may output YZFace[col].curMaxRow as "0" and may output YZFace[col].MaxRow as "0", based on that YZFace[col].curCnt is less than $Average_{YZFace}$. The processor may output YZFace[col].MaxRow as YZFace[col].curMaxRow and may output YZFace[col].MinRow as YZFace[col].curMinRow, based on that YZFace[col].curCnt is greater than or equal to $Average_{YZFace}$.

Hereinafter, a description will be given of an example of comparing the obtained grid maps (e.g., at least one of the first grid map 431 or the second grid map 433, or any combination thereof) with the reference grid map.

Figure 5:
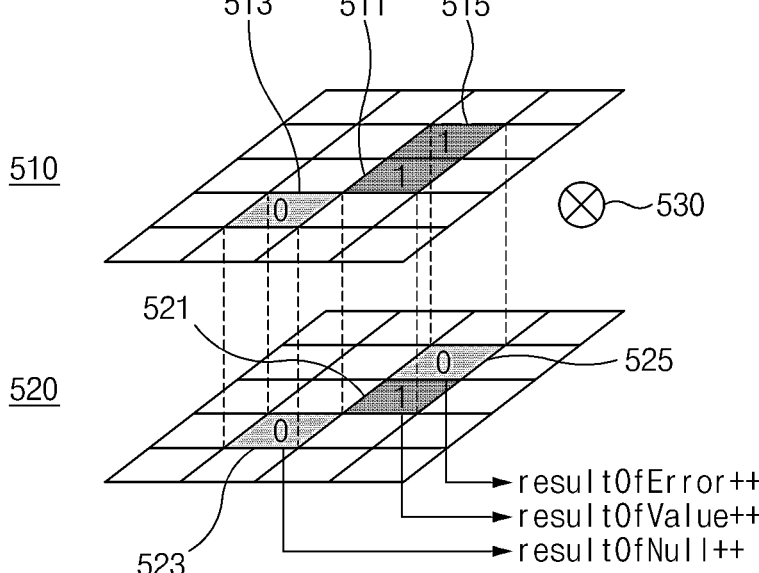
FIG. 5 shows an example of comparing a grid map corresponding to an external object with a reference grid map, in an example of the present disclosure.

FIG. 5 shows an example of comparing a grid map corresponding to an external object with a reference grid map, in an example of the present disclosure.

Processes described with reference to FIG. 5 may be performed by an object recognition apparatus 100 of FIG. 1. Alternatively, the processes described with reference to FIG. 5 may be performed by a processor 110 included in the object recognition apparatus 100 of FIG. 1.

Referring to FIG. 5, a processor of an object recognition apparatus according to an example may compare a grid map 520 with a reference grid map 510. For example, the object recognition apparatus may perform a combination 530 of grids included in the grid map 520 and reference grids included in the reference grid map 510. Hereinafter, operations of allocating a score may be included in an operation of calculating the score.

For example, the processor may perform the combination 530 of a first reference grid 511 included in the reference grid map 510 and a first grid 521 included in the grid map 520. For example, the processor may identify whether the first reference grid 511 and the first grid 521 are matched with each other. The processor may output "1" (e.g., Boolean value true), based on that the first reference grid 511 and the first grid 521 are matched with each other. For example, "1" which is output based on that the first reference grid 511 and the first grid 521 are matched with each other may be included in a matching number.

For example, the processor may perform the combination 530 of a second reference grid 513 included in the reference grid map 510 and a second grid 523 included in the grid map 520. For example, the processor may identify whether the second reference grid 513 and the second grid 523 are matched with each other. The processor may output "1", based on that the second reference grid 513 and the second grid 523 are matched with each other. For example, "1" which is output based on that the second reference grid 513 and the second grid 523 are matched with each other may be included in the matching number.

For example, the processor may perform the combination 530 of a third reference grid 515 included in the reference grid map 510 and a third grid 525 included in the grid map 520. For example, the processor may identify whether the third reference grid 515 and the third grid 525 are matched with each other. The processor may output "0" e.g., Boolean value false), based on that the third reference grid 515 and the third grid 525 are not matched with each other. For example, "0" which is output based on that the third reference grid 515 and the third grid 525 are not matched with each other may be included in a non-matching number.

The processor may allocate a score to the grid map 520, based on the matching number and the non-matching number, which are output by comparing the reference grid map 510 with the grid map 520. The processor may identify a type of an external object, based on the score allocated to the grid map 520.

For example, the processor may allocate a score using Equation 2 described below.

$$GFI = \frac{(resultOfValue + resultOfNull - resultOfError) * 100}{(AnsSizeYZ + NullSizeYZ)} \quad \text{[Equation 2]}$$

Referring to Equation 2 above, GFI is an abbreviation for goodness of fit index, which refers to suitability. resultOfValue of Equation 2 above may be output based on that a representation grid described with reference to FIG. 3 and at least one of upper grids, lower grids, or middle grids, which are described with reference to FIG. 4, or any combination thereof are matched with each other. resultOfNull of Equation 2 above may be output based on that a background grid described with reference to FIG. 3 and grids different from the upper grids, the lower grids, or the middle grids, which are described with reference to FIG. 4, are matched with each other. resultOfError of Equation 2 above may be output based on that grids included in the reference grid map and grids included in the grid map are not matched with each other. AnsSizeYZ of Equation 2 above may include the number of representation grids included in the first reference grid map represented on the y-axis and the z-axis. NullSizeYZ of Equation 2 above may include the number of background grids included in the first reference grid map represented on the y-axis and the z-axis.

For example, the processor may output at least one of resultOfValue++, resultOfNull++, or resultOfError++, or any combination thereof, using the instructions including Table 5 below.

TABLE 5

```
for (col < PIXEL_COL_SIZE)
for (row < PIXEL_ROW_SIZE)
if (AnsYZFace[col][ row] == 1 && TestYZFace[col][row] == 1)
resultOfValue++
else if (AnsYZFazce[col][row] == 0 && TestYZFace[col][row] ==0)
resultOfNull++
else resultOfError++
```

Table 5 above may include an instruction for comparing the first surface formed by the y-axis and the z-axis with the first reference grids included in the first reference grid map.

For example, for (col<PIXEL_COL_SIZE) 및 for (row<PIXEL_ROW_SIZE) may include an instruction for sequentially comparing the plurality of rows and the plurality of columns. For example, if the first grid corresponding to the first reference grid included in the first reference grid map, which is included in the first grid map, is matched, if (AnsYZFace[col] [row]==1 && TestYZFace[col] [row] ==1) and resultOfValue++ may include an instruction to output resultOfValue++.

For example, when the first grid corresponding to the first reference grid included in the first reference grid map, which is included in the first grid map, is matched, else if (AnsYZFazce [col] [row]==0 & TestYZFace[col] [row]==0) and resultOfNull++ may include an instruction to output resultOfNull++.

For example, if at least one of resultOfValue++ or resultOfNull++, which is described above, or any combination thereof is not output, else resultOfError++ may include an instruction to output resultOfError++.

In an example, the processor may allocate a score for the first grid map, based on the instructions included in Table 5 above. The processor may allocate a score to the first grid map using the instructions included in Table 5 above and may identify a type of the external object corresponding to the first grid map, based on the score allocated to the first grid map.

In an example, the processor may allocate a score to a second grid map, using instructions in which some of the instructions included in Table 5 above are changed. For example, the processor may allocate a score to the second grid map and may identify a type of the external object corresponding to the second grid map, based on the score allocated to the second grid map.

For example, the processor may allocate a first score calculated based on the first grid map and the first reference grid map included in the reference grid maps to the first grid map. For example, the processor may allocate a second score calculated based on the second grid map and the second reference grid map included in the reference grid maps to the second grid map. The processor may identify a type of the external object, based on at least one of the first score or the second score, or any combination thereof.

For example, if the external object is identified on the same lane as a host vehicle including the object recognition apparatus, t the processor may allocate the first score to the first grid map. The processor may identify a type of the external object, based on that the first score is greater than a first reference score.

For example, if the external object is identified on a different lane from the host vehicle including the object recognition apparatus, the processor may allocate the first score to the first grid map and may allocate the second score to the second grid map. The processor may identify a type of the external object or may temporarily store the type of the external object, based on that a total score obtained by adding the first score and the second score is greater than a second reference score greater than the first reference score.

FIG. 6 shows an example of a flowchart associated with an object recognition method according to another example of the present disclosure.

Hereinafter, it is assumed that an object recognition apparatus 100 of FIG. 1 performs a process of FIG. 6. Furthermore, in a description of FIG. 6, an operation described as being performed by an apparatus may be understood as being controlled by a processor 110 of the object recognition apparatus 100.

At least one of the operations of FIG. 6 may be performed by the object recognition apparatus 100 of FIG. 1. The respective operations of FIG. 6 may be sequentially performed, but are not necessarily sequentially performed. For example, an order of the respective operations may be changed, and at least two operations may be performed in parallel.

Referring to FIG. 6, in S601, the object recognition method according to an example may include projecting a plurality of points indicating an external object obtained by LiDAR onto a first surface formed by a y-axis and a z-axis among an x-axis, the y-axis, and the z-axis. The object recognition method may include projecting the plurality of points indicating the external object obtained by the LiDAR onto the first surface to obtain a first grid map including a first plurality of grids.

The obtaining of the first grid map may include processes described with reference to FIG. 4.

In S602, the object recognition method according to an example may include projecting the plurality of points indicating the external object obtained by the LiDAR onto a second surface formed by the x-axis and the z-axis among the x-axis, the y-axis, and the z-axis. The object recognition method may include projecting the plurality of points indicating the external object obtained by the LiDAR onto the second surface to obtain a second grid map including a second plurality of grids.

The obtaining of the second grid map may include the processes described with reference to FIG. 4.

In S603, the object recognition method according to an example may include identifying whether at least one of reference grid maps representing the appearance of a vehicle, which are stored in a memory, and at least one of the first grid map or the second grid map, or any combination thereof are matched with each other.

For example, the object recognition method may include identifying a type of the external object, based on that the at least the reference grid maps representing the appearance of the vehicle, which are stored in the memory, and the at least one of the first grid map or the second grid map, or the any combination thereof are matched with each other.

Figure 7:
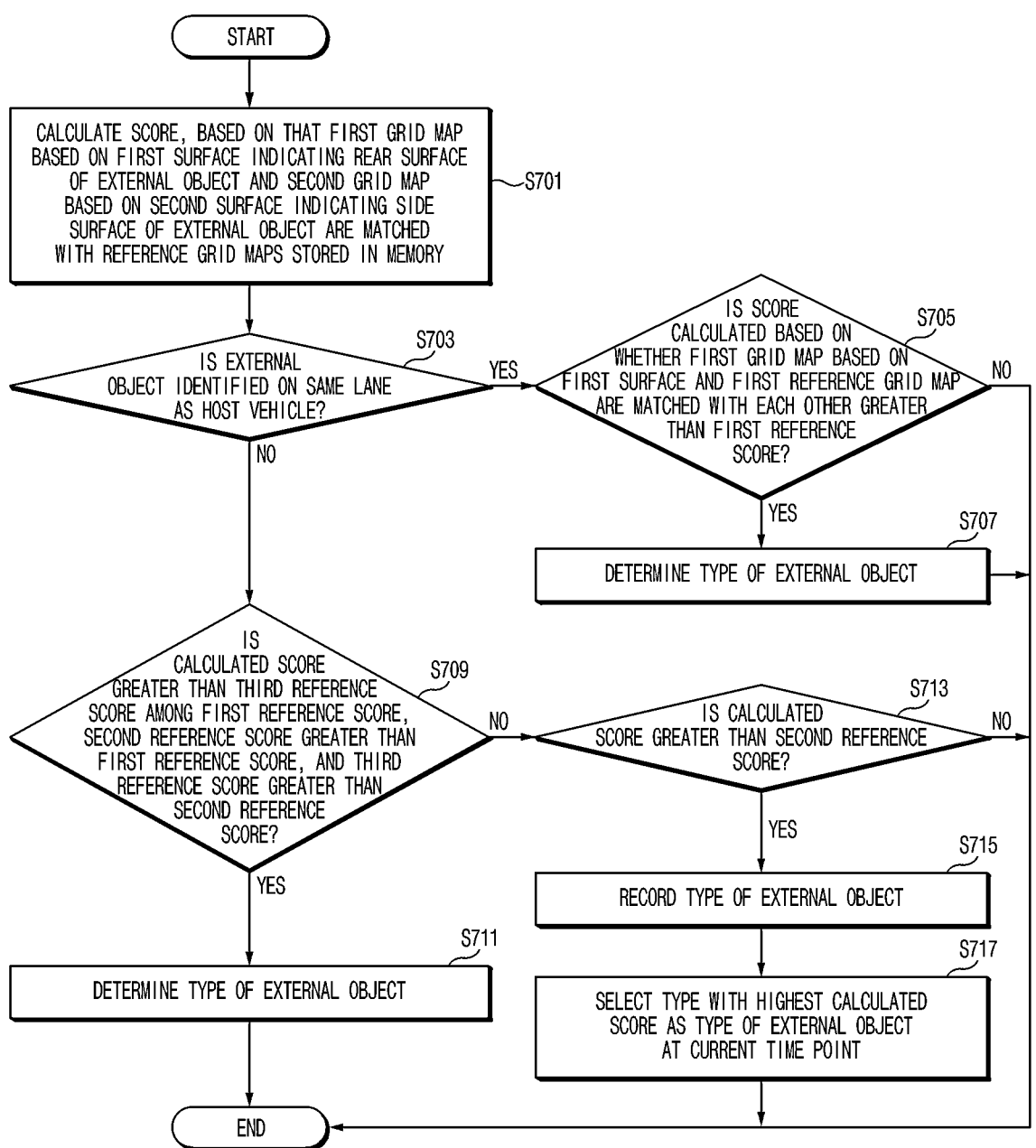
FIG. 7 shows an example of a flowchart associated with an object recognition method according to an example of the present disclosure.

FIG. 7 shows an example of a flowchart associated with an object recognition method according to an example of the present disclosure.

Hereinafter, it is assumed that an object recognition apparatus 100 of FIG. 1 performs a process of FIG. 7. Furthermore, in a description of FIG. 7, an operation described as being performed by an apparatus may be understood as being controlled by a processor 110 of the object recognition apparatus 100.

At least one of the operations of FIG. 7 may be performed by the object recognition apparatus 100 of FIG. 1. The respective operations of FIG. 7 may be sequentially performed, but are not necessarily sequentially performed. For example, an order of the respective operations may be changed, and at least two operations may be performed in parallel.

Referring to FIG. 7, in S701, the object recognition method according to an example may include obtaining a first grid map based on a first surface indicating a rear surface of an external object. The object recognition method may include obtaining a second grid map based on a second surface indicating a side surface of the external object.

The object recognition method may include calculating a score, based on that the first grid map and the second grid map are matched with reference grid maps stored in a memory. The calculating of the score may include allocating the score described with reference to FIG. 5.

In S703, the object recognition method according to an example may include identifying a lane on which the external object is traveling. For example, the object recognition method may include determining whether the external object is identified on the same lane as a host vehicle.

If the external object is identified on the same lane as the host vehicle (YES of S703), in S705, the object recognition method according to an example may include identifying whether a score calculated based on whether the first grid map based on the first surface and a first reference grid map are matched with each other is greater than a first reference score. For example, the first reference score may include about 70 points.

If the external object operates on the same lane as the host vehicle, because of obtaining a first plurality of points corresponding to a rear surface of the external object, the object recognition method may include identifying a type of the external object, using the first grid map based on the first surface and the first reference grid map.

When the score calculated based on whether the first grid map based on the first surface and the first reference grid map are matched with each other is greater than the first reference score (YES of S705), in S707, the object recognition method according to an example may include determining a type of the external object. For example, when the score calculated based on whether the first grid map and the first reference grid map are matched with each other is greater than the first reference score, the t object recognition method may include identifying the type of the external object and determining the type of the external object to label the external object with the determined type.

When the score calculated based on whether the first grid map based on the first surface and the first reference grid map are matched with each other is less than or equal to the first reference score (NO of S705), the object recognition method according to an example may end the process to which the present technology is applied.

If the external object is not identified on the same lane as the host vehicle (NO of S703), in S709, the object recognition method according to an example may include identifying whether the calculated score is greater than a third reference score among the first reference score, a second reference score greater than the first reference score, and the third reference score greater than the second reference score.

For example, the first reference score may include about 70 points. For example, the second reference score may include about 140 points. For example, the third reference score may include about 160 points.

For example, if the external object is not identified on the same lane as the host vehicle, the object recognition method may include obtaining a first score calculated based on whether the first grid map based on the first surface indicating the rear surface of the external object and the first reference grid map are matched each other. The object recognition method may include obtaining a second score calculated based on whether the second grid map based on the second surface indicating the side surface of the external object and the second reference grid map are matched each other.

The object recognition method may include identifying the type of the external object, based on a total score obtained by adding the obtained first score and the obtained second score. The object recognition method may include identifying whether the total score is greater than the third reference score.

If the calculated score is greater than the third reference score (YES of S709), the object recognition method according to an example may include determining the type of the external object.

For example, if the calculated score (e.g., the total score) is greater than the third reference score, the object recognition method may include identifying the type of the external object and determining the type of the external object to label the external object with the determined type.

If the calculated score is less than or equal to the third reference score (NO of S709), in S713, the object recognition method according to an example may include identifying whether the calculated score is greater than the second reference score.

If the calculated score is greater than the second reference score (YES of S713), in S715, the object recognition method according to an example may include recording the type of the external object. For example, the recording of the type of the external object may include temporarily storing the type of the external object in a separate area of the memory.

If the calculated score is less than or equal to the second reference score (NO of S713), the object recognition method according to an example may include ending the process to which the present technology is applied.

In S717, the object recognition method according to an example may include selecting a type with the highest calculated score as the type of the external object at a current time point. For example, if a plurality of types of the external object are temporarily stored, the object recognition method may include identifying the highest score among the total scores for identifying the plurality of stored types. The object recognition method may include selecting the type corresponding to the highest score among the total scores as the type of the external object.

Figure 8:
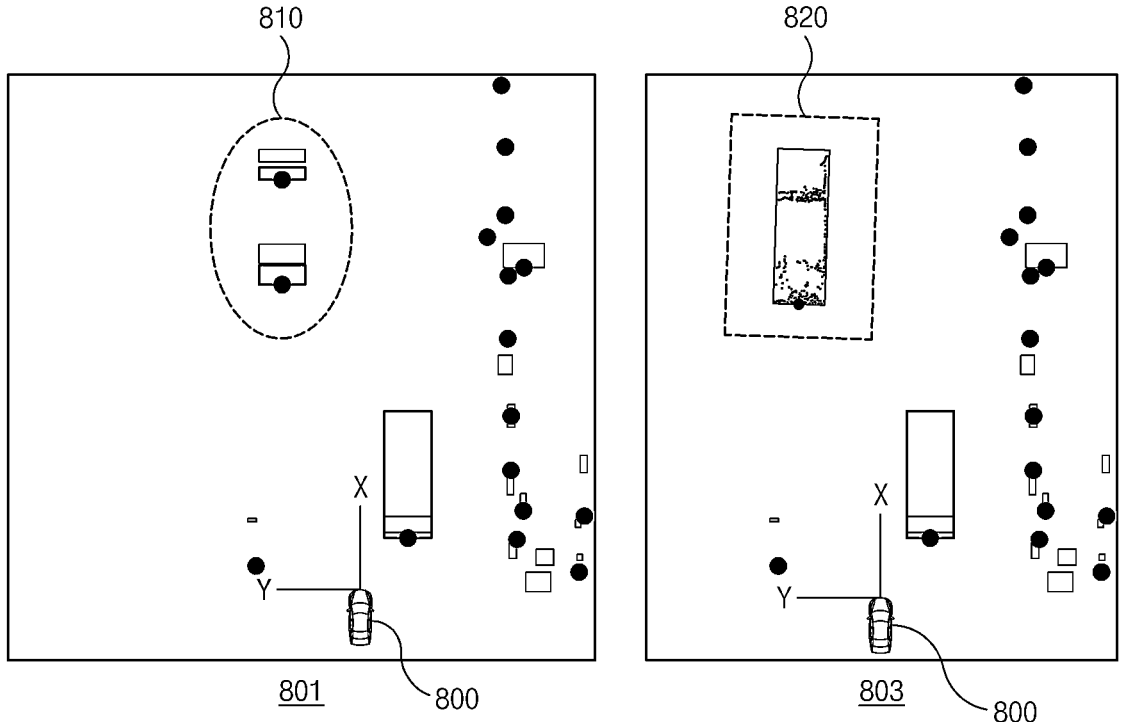
FIG. 8 shows an example of a result in which an object recognition apparatus identifies a type of an external object according to an example of the present disclosure.

FIG. 8 shows an example of a result in which an object recognition apparatus identifies a type of an external object according to an example of the present disclosure.

A host vehicle 800 of FIG. 8 may include an object recognition apparatus 100 of FIG. 1.

Referring to FIG. 8, in a first example 801, a processor of an object recognition apparatus according to an example may identify an external object 810 using a sensor (e.g., LiDAR sensor). For example, the external object 810 may correspond to another vehicle (e.g., a truck including a head part and a tail part) or a pedestrian.

For example, when identifying the external object 810 using the LiDAR, because the processor identifies a type of the external object 810 using a cluster of points (e.g., point cloud), the external object 810, the head part and the tail part of which are separated from each other, may be identified. As described above, when identifying the external object 810, the head part and the tail part of which are separated from each other, the processor may incorrectly identify a heading direction of the external object 810.

A second example 803 may include an example of applying the present technology to identify a type of an external object 820. For example, the processor may determine or identify the type of the external object 820 using at least one of a first grid map or a second grid map, which indicates the external object 820, or any combination thereof, thus accurately determining or identifying the external object 820. The processor may accurately identify the external object 820, thus reducing the case in which the external object 820 is separated and identified.

Figure 9:
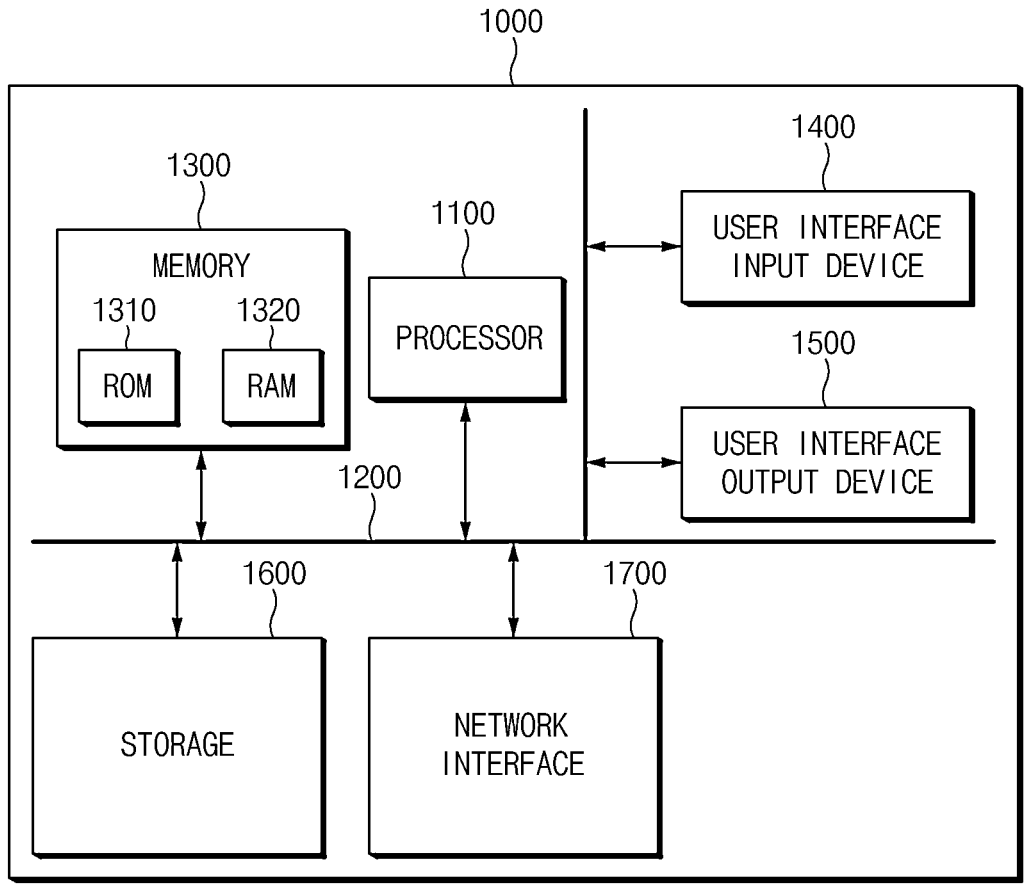
FIG. 9 shows an example of a computing system including an object recognition apparatus according to an example of the present disclosure.

FIG. 9 shows an example of a computing system including an object recognition apparatus according to an example of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present disclosure has been made to solve the above-mentioned problems occurring in the prior art while advantages achieved by the prior art are maintained intact.

An example of the present disclosure provides an object recognition apparatus for identifying a type of an external object using a reference grid map and a method thereof.

Another example of the present disclosure provides an object recognition apparatus for identifying a type of an external object using a maximum value and a minimum value of a plurality of points obtained using a sensor (e.g., LiDAR sensor) to reduce the amount of calculation of the processor and a method thereof.

Another example of the present disclosure provides an object recognition apparatus for accurately identifying a type of an external object to reduce an error in a vehicle control system including the object recognition apparatus and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, an object recognition apparatus may include light detection and ranging (LiDAR), a memory, and a processor. The processor may project a plurality of points indicating an external object obtained by the LiDAR onto a first surface formed by a second axis and a third axis among a first axis, the second axis, and the third axis to obtain a first grid map including a first plurality of grids, may project the plurality of points indicating the external object obtained by the LiDAR onto a second surface formed by the first axis and the third axis to obtain a second grid map including a second plurality of grids, and may identify a type of the external object, based on that at least one of reference grid maps representing the appearance of a vehicle, the reference grid maps being stored in the memory, and at least one of the first grid map or the second grid map, or any combination thereof are matched with each other.

In an example, the processor may obtain the at least one of the first grid map or the second grid map, or the any combination thereof, based on that the external object is identified as a moving state between a static state and the moving state.

In an example, the processor may identify at least one (e.g., all or some) ne of a first plurality of points included in the first plurality of grids among the plurality of points and may obtain the first grid map corresponding to a rear surface of the external object, based on first grids including the all or some of the first plurality of points among the first plurality of grids.

In an example, the processor may identify first maximum values including a maximum value of the first plurality of points included in each of a plurality of columns, in a plurality of rows and the plurality of columns included in the first grid map, may identify first minimum values including a minimum value of the first plurality of points included in each of the plurality of columns, and may obtain the first grid map indicating a rear outline of the external object, based on the first maximum values and the first minimum values.

In an example, the processor may identify first upper grids corresponding to the first maximum values, first lower grids corresponding to the first minimum values, and first middle grids included between the first upper grids and the first lower grids, may identify first reference grids included in first reference grid maps representing a rear surface of the vehicle among the reference grid maps, may identify whether first upper matching between the first upper grids and the first reference grids is performed, may identify whether first lower matching between the first lower grids and the first reference grids is performed, may identify whether first middle matching between the first middle grids and the first reference grids is performed, and may identify the type of the external object, based on a matching number and a non-matching number calculated by means of whether the first upper matching is performed, whether the first lower matching is performed, and whether the first middle matching is performed.

In an example, the processor may identify all or some of a second plurality of points included in the second plurality of grids among the plurality of points and may obtain the second grid map corresponding to a side surface of the external object, based on second grids including the all or some of the second plurality of points among the second plurality of grids.

In an example, the processor may identify second maximum values including a maximum value of the second plurality of points included in each of a plurality of columns, in a plurality of rows and the plurality of columns included in the second grid map, may identify second minimum values including a minimum value of the second plurality of points included in each of the plurality of columns, and may obtain the second grid map indicating a rear outline of the external object, based on the second maximum values and the second minimum values.

In an example, the processor may identify second upper grids corresponding to the second maximum values, second lower grids corresponding to the second minimum values, and second middle grids included between the second upper grids and the second lower grids, may identify second reference grids included in second grid maps representing a side surface of the vehicle among the reference grid maps, may identify whether second upper matching between the second upper grids and the second reference grids is performed, may identify whether second lower matching between the second lower grids and the second reference grids is performed, may identify whether second middle matching between the second middle grids and the second reference grids is performed, and may identify the type of the external object, based on the a matching number and a non-matching number calculated by means of whether the second upper matching is performed, whether the second lower matching is performed, and whether the second middle matching is performed.

In an example, the processor may allocate a first score calculated based on the first grid map and a first reference grid map included in the reference grid maps to the first grid map, may allocate a second score calculated based on the second grid map and a second reference grid map included in the reference grid maps to the second grid map, and may identify the type of the external object, based on at least one of the first score or the second score, or any combination thereof.

In an example, the processor may allocate the first score to the first grid map, if the external object is identified on the same lane as a host vehicle including the object recognition apparatus, may identify the type of the external object, based on that the first score is greater than a first reference score, may allocate the first score to the first grid map, if the external object is identified on a different lane from the host vehicle including the object recognition apparatus, may allocate the second score to the second grid map, if the external object is identified on the different lane from the host vehicle including the object recognition apparatus, and may identify the type of the external object or temporarily store the type of the external object, based on that a total score obtained by adding the first score and the second score is greater than a second reference score greater than the first reference score.

According to another example of the present disclosure, an object recognition method may include projecting a plurality of points indicating an external object obtained by LiDAR onto a first surface formed by a second axis and a third axis among a first axis, the second axis, and the third axis to obtain a first grid map including a first plurality of grids, projecting the plurality of points indicating the external object obtained by the LiDAR onto a second surface formed by the first axis and the third axis to obtain a second grid map including a second plurality of grids, and identifying a type of the external object, based on that at least one of reference grid maps representing the appearance of a vehicle, the reference grid maps being stored in a memory, and at least one of the first grid map or the second grid map, or any combination thereof are matched with each other.

The object recognition method according to an example may further include obtaining the at least one of the first grid map or the second grid map, or the any combination thereof, based on that the external object is identified as a moving state between a static state and the moving state.

The object recognition method according to an example may further include identifying at least one (e.g., all or some) of a first plurality of points included in the first plurality of grids among the plurality of points and obtaining the first grid map corresponding to a rear surface of the external object, based on first grids including the all or some of the first plurality of points among the first plurality of grids.

The object recognition method according to an example may further include obtaining first maximum values including a maximum value of the first plurality of points included in each of a plurality of columns, in a plurality of rows and the plurality of columns included in the first grid map, obtaining first minimum values including a minimum value of the first plurality of points included in each of the plurality of columns, and obtaining the first grid map indicating a rear outline of the external object, based on the first maximum values and the first minimum values.

The object recognition method according to an example may further include identifying first upper grids corresponding to the first maximum values, first lower grids corresponding to the first minimum values, and first middle grids included between the first upper grids and the first lower grids, identifying first reference grids included in first reference grid maps representing a rear surface of the vehicle among the reference grid maps, identifying whether first upper matching between the first upper grids and the first reference grids is performed, identifying whether first lower matching between the first lower grids and the first reference grids is performed, identifying whether first middle matching between the first middle grids and the first reference grids is performed, and identifying the type of the external object, based on the a matching number and a non-matching number calculated by means of whether the first upper matching is performed, whether the first lower matching is performed, and whether the first middle matching is performed.

The object recognition method according to an example may further include identifying at least one (e.g., all or some) of a second plurality of points included in the second plurality of grids among the plurality of points and obtaining the second grid map corresponding to a side surface of the external object, based on second grids including the all or some of the second plurality of points among the second plurality of grids.

The object recognition method according to an example may further include identifying second maximum values and second minimum values in which some of the plurality of points are identified, in a plurality of columns among a plurality of rows and the plurality of columns included in the second grid map, and obtaining the second grid map representing a rear outline of the external object, based on the second maximum values and the second minimum values.

The object recognition method according to an example may further include identifying second upper grids corresponding to the second maximum values, second lower grids corresponding to the second minimum values, and second middle grids included between the second upper grids and the second lower grids, identifying second reference grids included in second grid maps representing a side surface of the vehicle among the reference grid maps, identifying whether second upper matching between the second upper grids and the second reference grids is performed, identifying whether second lower matching between the second lower grids and the second reference grids is performed, identifying whether second middle matching between the second middle grids and the second reference grids is performed, and identifying the type of the external object, based on the a matching number and a non-matching number calculated by means of whether the second upper matching is performed, whether the second lower matching is performed, and whether the second middle matching is performed.

The object recognition method according to an example may further include allocating a first score calculated based on the first grid map and a first reference grid map included in the reference grid maps to the first grid map, allocating a second score calculated based on the second grid map and a second reference grid map included in the reference grid maps to the second grid map, and identifying the type of the external object, based on at least one of the first score or the second score, or any combination thereof.

The object recognition method according to an example may further include allocating the first score to the first grid, if the external object is identified on the same lane as a host vehicle including an object recognition apparatus, identifying the type of the external object, based on that the first score is greater than a first reference score, allocating the first score to the first grid map, if the external object is identified on a different lane from the host vehicle including the object recognition apparatus, allocating the second score to the second grid map, if the external object is identified on the different lane from the host vehicle including the object recognition apparatus, and identifying the type of the external object or temporarily storing the type of the external object, based on that a total score obtained by adding the first score and the second score is greater than a second reference score greater than the first reference score.

The present technology may identify a type of an external object using a reference grid map.

Furthermore, the present technology may identify the type of the external object using a maximum value and a minimum value of a plurality of points obtained using the LiDAR, thus reducing the amount of calculation of the processor.

Furthermore, the present technology may accurately identify the type of the external object, thus reducing an error in a vehicle control system including the object recognition apparatus.

In addition, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus comprising:

a sensor;

a memory configured to store reference grid maps representing an appearance of a vehicle; and a processor configured to:

project a plurality of points indicating an external object onto a first surface to obtain a first grid map including a first plurality of grids, wherein:

the external object is obtained based on sensing information obtained by the sensor, and the first surface is formed by a second axis and a third axis among a first axis, the second axis, and the third axis, wherein the first axis is parallel to a driving direction of the vehicle and perpendicular to the second axis, and the third axis is perpendicular to the first axis and the second axis;

project the plurality of points indicating the external object onto a second surface to obtain a second grid map including a second plurality of grids, wherein the second surface is formed by the first axis and the third axis;

determine, based on at least one of the reference grid maps, the first grid map, or the second grid map, a type of the external object; and output a signal indicating the type of the external object.

2. The apparatus of claim 1, wherein the processor is configured to:

obtain, based on the external object being determined as in a moving state, at least one of the first grid map or the second grid map.

3. The apparatus of claim 1, wherein the processor is configured to:

determine at least one of a first plurality of points among the plurality of points, wherein the first plurality of points are included in the first plurality of grids; and obtain, based on first grids including the at least one of the first plurality of points, the first grid map, wherein the first grid map corresponds to a rear surface of the external object.

4. The apparatus of claim 3, wherein the processor is configured to:

determine first maximum values including a maximum value of the first plurality of points, wherein the first plurality of points are included in each of a plurality of columns in a plurality of rows, and the plurality of columns are included in the first grid map;

determine first minimum values including a minimum value of the first plurality of points; and obtain, based on the first maximum values and the first minimum values, the first grid map indicating a rear outline of the external object.

5. The apparatus of claim 4, wherein the processor is configured to:

determine first upper grids corresponding to the first maximum values, first lower grids corresponding to the first minimum values, and first middle grids included between the first upper grids and the first lower grids;

determine first reference grids included in first reference grid maps among the reference grid maps, wherein the first reference grid maps represent a rear surface of the vehicle;

determine whether first upper matching between the first upper grids and the first reference grids is performed;

determine whether first lower matching between the first lower grids and the first reference grids is performed;

determine whether first middle matching between the first middle grids and the first reference grids is performed; and determine, based on determinations of whether the first upper matching is performed, whether the first lower matching is performed, and whether the first middle matching is performed, the type of the external object.

6. The apparatus of claim 1, wherein the processor is configured to:

determine at least one of a second plurality of points among the plurality of points, wherein the second plurality of points are included in the second plurality of grids; and obtain, based on second grids including the at least one of the second plurality of points, the second grid map, wherein the second grid map corresponds to a side surface of the external object.

7. The apparatus of claim 6, wherein the processor is configured to:

determine second maximum values including a maximum value of the second plurality of points, wherein the second plurality of points are included in each of a plurality of columns in a plurality of rows, and the plurality of columns are included in the second grid map;

determine second minimum values including a minimum value of the second plurality of points; and obtain, based on the second maximum values and the second minimum values, the second grid map, wherein the second grid map indicates a rear outline of the external object.

8. The apparatus of claim 7, wherein the processor is configured to:

determine second upper grids corresponding to the second maximum values, second lower grids corresponding to the second minimum values, and second middle grids included between the second upper grids and the second lower grids;

determine second reference grids included in second grid maps among the reference grid maps, wherein the second grid maps represent a side surface of the vehicle;

determine whether second upper matching between the second upper grids and the second reference grids is performed;

determine whether second lower matching between the second lower grids and the second reference grids is performed;

determine whether second middle matching between the second middle grids and the second reference grids is performed; and determine, based on determinations of whether the second upper matching is performed, whether the second lower matching is performed, and whether the second middle matching is performed, the type of the external object.

9. The apparatus of claim 1, wherein the processor is configured to:

allocate a first score to the first grid map, wherein the first score is determined based on the first grid map and a first reference grid map included in the reference grid maps;

allocate a second score to the second grid map, wherein the second score is determined based on the second grid map and a second reference grid map included in the reference grid maps; and determine, based on at least one of the first score or the second score, the type of the external object.

10. The apparatus of claim 9, wherein the processor is configured to:

allocate, based on the external object being detected on a same lane as a host vehicle including the apparatus, the first score to the first grid map;

determine, based on the first score being greater than a first reference score, the type of the external object;

allocate, based on the external object being detected on a different lane from the host vehicle including the apparatus, the first score to the first grid map;

allocate, based on the external object being detected on the different lane from the host vehicle including the apparatus, the second score to the second grid map; and determine, based on a total score obtained by adding the first score and the second score being greater than a second reference score and the first reference score, the type of the external object or temporarily store information indicating the type of the external object.

11. A method performed by a processor, the method comprising:

projecting a plurality of points indicating an external object onto a first surface to obtain a first grid map including a first plurality of grids, wherein:

the external object is obtained based on sensing information obtained by a sensor, and the first surface is formed by a second axis and a third axis among a first axis, the second axis, and the third axis, wherein the first axis is parallel to a driving direction of a vehicle and perpendicular to the second axis, and the third axis is perpendicular to the first axis and the second axis;

projecting the plurality of points indicating the external object onto a second surface to obtain a second grid map including a second plurality of grids, wherein the second surface is formed by the first axis and the third axis;

determining, based on at least one of reference grid maps being stored in a memory, the first grid map, or the second grid map, a type of the external object, wherein the reference grid maps represent an appearance of the vehicle; and outputting a signal indicating the type of the external object.

12. The method of claim 11, further comprising:

obtaining, based on the external object being determined as in a moving state, at least one of the first grid map or the second grid map.

13. The method of claim 11, further comprising:

determining at least one of a first plurality of points among the plurality of points, wherein the first plurality of points are included in the first plurality of grids; and obtaining, based on first grids including the at least one of the first plurality of points, the first grid map, wherein the first grid map corresponds to a rear surface of the external object.

14. The method of claim 13, further comprising:

obtaining first maximum values including a maximum value of the first plurality of points, where in the first plurality of points are included in each of a plurality of columns in a plurality of rows, and the plurality of columns included in the first grid map;

obtaining first minimum values including a minimum value of the first plurality of points; and obtaining, based on the first maximum values and the first minimum values, the first grid map indicating a rear outline of the external object.

15. The method of claim 14, further comprising:

determining first upper grids corresponding to the first maximum values, first lower grids corresponding to the first minimum values, and first middle grids included between the first upper grids and the first lower grids;

determining first reference grids included in first reference grid maps among the reference grid maps, wherein the first reference grid maps represent a rear surface of the vehicle;

determining whether first upper matching between the first upper grids and the first reference grids is performed;

determining whether first lower matching between the first lower grids and the first reference grids is performed;

determining whether first middle matching between the first middle grids and the first reference grids is performed; and determining, based on determinations of whether the first upper matching is performed, whether the first lower matching is performed, and whether the first middle matching is performed, the type of the external object.

16. The method of claim 11, further comprising:

determining at least one of a second plurality of points among the plurality of points, wherein the second plurality of points are included in the second plurality of grids; and obtaining, based on second grids including the at least one of the second plurality of points, the second grid map, wherein the second grid map corresponds to a side surface of the external object.

17. The method of claim 16, further comprising:

determining second maximum values including a maximum value of the second plurality of points, wherein the second plurality of points are included in each of a plurality of columns in a plurality of rows, and the plurality of columns are included in the second grid map;

determining second minimum values including a minimum value of the second plurality of points; and obtaining, based on the second maximum values and the second minimum values, the second grid map, wherein the second grid map represents a rear outline of the external object.

18. The method of claim 17, further comprising:

determining second upper grids corresponding to the second maximum values, second lower grids corresponding to the second minimum values, and second middle grids included between the second upper grids and the second lower grids;

determining second reference grids included in second grid maps among the reference grid maps, wherein the second grid maps represent a side surface of the vehicle;

determining whether second upper matching between the second upper grids and the second reference grids is performed;

determining whether second lower matching between the second lower grids and the second reference grids is performed;

determining whether second middle matching between the second middle grids and the second reference grids is performed; and determining, based determinations of whether the second upper matching is performed, whether the second lower matching is performed, and whether the second middle matching is performed, the type of the external object.

19. The method of claim 11, further comprising:

allocating a first score to the first grid map, wherein the first score is determined based on the first grid map and a first reference grid map included in the reference grid maps;

allocating a second score to the second grid map, wherein the second score is determined based on the second grid map and a second reference grid map included in the reference grid maps; and determining, based on at least one of the first score or the second score, the type of the external object.

20. The method of claim 19, further comprising:

based on the external object being detected on a same lane as a host vehicle including the processor, allocating the first score to the first grid map, and determining, based on the first score being greater than a first reference score, the type of the external object; or based on the external object being detected on a different lane from the host vehicle including the processor, allocating the first score to the first grid map, allocating the second score to the second grid map, and determining, based on a total score obtained by adding the first score and the second score being greater than a second reference score and the first reference score, the type of the external object or temporarily storing the type of the external object.

\*    \*    \*    \*    \*